(12) United States Patent
Kim et al.

(10) Patent No.: US 9,414,405 B2
(45) Date of Patent: Aug. 9, 2016

(54) METHOD FOR A TERMINAL TO RECEIVE A DOWNLINK SIGNAL IN A COOPERATIVE BASE STATION WIRELESS COMMUNICATION SYSTEM AND DEVICE FOR SAME

(75) Inventors: Hakseong Kim, Anyang-si (KR);
Hanbyul Seo, Anyang-si (KR);
Byounghoon Kim, Anyang-si (KR);
Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 151 days.

(21) Appl. No.: 14/124,186

(22) PCT Filed: Jun. 12, 2012

(86) PCT No.: PCT/KR2012/004623
§ 371 (c)(1),
(2), (4) Date: Dec. 5, 2013

(87) PCT Pub. No.: WO2012/173368
PCT Pub. Date: Dec. 20, 2012

(65) Prior Publication Data
US 2014/0098779 A1  Apr. 10, 2014

Related U.S. Application Data

(60) Provisional application No. 61/496,531, filed on Jun. 13, 2011.

(51) Int. Cl.
*H04W 72/12* (2009.01)
*H04B 7/02* (2006.01)
*H04L 5/00* (2006.01)

(52) U.S. Cl.
CPC ........... *H04W 72/1273* (2013.01); *H04B 7/024* (2013.01); *H04L 5/0035* (2013.01); *H04L 5/0044* (2013.01); *H04L 5/001* (2013.01); *H04L 5/0053* (2013.01)

(58) Field of Classification Search
CPC ................................................. H04W 72/1273
USPC ........................................................ 370/329
See application file for complete search history.

(56) References Cited

U.S. PATENT DOCUMENTS

| 8,325,701 | B2 | 12/2012 | Yamauchi et al. |
| 8,451,790 | B2 * | 5/2013 | Dai et al. ............... 370/329 |
| 8,452,284 | B2 | 5/2013 | Seki |
| 8,607,119 | B2 | 12/2013 | Cheng et al. |

(Continued)

FOREIGN PATENT DOCUMENTS

| KR | 10-2009-0115127 A | 11/2009 |
| KR | 10-2009-0051247 A | 1/2010 |

(Continued)

OTHER PUBLICATIONS

Huawei et al., "Proposal on ordering and segmentation of HARQ-ACK bits", 3GPP TSG RAN WG1 Meeting #64, Agenda 6.2.1, Taipei, Feb. 21-25, 2011, 6 pages, R1-110901, XP50490780A.

(Continued)

*Primary Examiner* — Jeffrey M Rutkowski
*Assistant Examiner* — Mehedi S Aley
(74) *Attorney, Agent, or Firm* — Birch, Stewart, Kolasch & Birch, LLP

(57) ABSTRACT

A method of receiving a downlink signal from a plurality of cells at a user equipment in a cell cooperative wireless communication system is described. Downlink control information including downlink scheduling information for a serving cell and one or more coordinating cells at the user equipment from the serving cell is received. Whether the downlink control information includes one resource assignment field or at least two assignment fields is monitored. Depending upon monitoring, a downlink data signal from the serving cell and the one or more coordinating cells using the downlink scheduling information is received. The downlink control information for the downlink data signal is received through one Physical Downlink Control Channel. The downlink data signal received from each of the serving cell and the one or more coordinating cells is either received on an identical frequency band or a partially overlapped frequency band.

11 Claims, 16 Drawing Sheets

(56) References Cited

U.S. PATENT DOCUMENTS

| | | | |
|---|---|---|---|
| 2009/0010238 A1* | 1/2009 | Barak | H04L 25/0226 370/342 |
| 2011/0034175 A1* | 2/2011 | Fong | H04B 7/024 455/450 |
| 2011/0134875 A1* | 6/2011 | Ding | H04B 7/024 370/329 |
| 2011/0222500 A1 | 9/2011 | Takaoka et al. | |
| 2011/0317637 A1* | 12/2011 | Kim | H04L 1/1819 370/329 |
| 2013/0064190 A1* | 3/2013 | Hariharan | H04L 5/0053 370/329 |
| 2013/0272206 A1* | 10/2013 | Li et al. | 370/328 |

FOREIGN PATENT DOCUMENTS

| | | |
|---|---|---|
| KR | 10-2010/002602 A | 1/2010 |
| KR | 10-2010-0065865 A | 6/2010 |
| WO | WO 2010/055676 A1 | 5/2010 |
| WO | WO 2010/105145 A1 | 9/2010 |

OTHER PUBLICATIONS

NTT DOCOMO et al., "AMC and HARQ Using Frequency Domain Channel-dependent Scheduling in MIMO Channel Transmission", 3GPP TSG RAN WG1 #42 on LTE, Agenda Item: 10,5.2, London, UK, Aug. 29-Sep. 2, 2005, pp. 1-8, R1-050942, XP003018588.

3GPP TR 36.912, 3rd Generation Partnership Project; Technical Specification Group Radio Access Network; Feasibility Study for Further Advancements for E-UTRA (LTE-Advanced) (Release 10); V10.0.0, Mar. 2011, 62 pages.

* cited by examiner (a) Control plane protocol stack (b) User plane protocol stack

FIG. 13

| CIF (3bit) | RA Hdr. | cell (N/P) | TPC (2bit) |

| HARQ (3bit) | Scrbl ID&# of Layer (3 bit) | MCS1 (5bit) | NDI1 Ant P | RV1 (2bit) | MCS1 (5bit) | NDI2 Ant P | RV1 (2bit) |

FIG. 14

| CIF (3bit) | RA Hdr. | cell (N/P) | cell (N/P) | TPC (2bit) |
|---|---|---|---|---|

| HARQ (3bit) | Scrbl ID&# of Layer (3 bit) | MCS1 (5bit) | NDI1 Ant P | RV1 (2bit) | MCS1 (5bit) | NDI2 Ant P | RV1 (2bit) |
|---|---|---|---|---|---|---|---|

METHOD FOR A TERMINAL TO RECEIVE A DOWNLINK SIGNAL IN A COOPERATIVE BASE STATION WIRELESS COMMUNICATION SYSTEM AND DEVICE FOR SAME

CROSS REFERENCE TO RELATED APPLICATIONS

This application is the National Phase of PCT/KR2012/004623 filed on Jun. 12, 2012, which claims priority under 35 U.S.C. 119(e) to U.S. Provisional Application No. 61/496,531 filed on Jun. 13, 2011, all of which are hereby expressly incorporate by reference into the present application.

TECHNICAL FIELD

The present invention relates to a wireless communication system, and more particularly, to a method of receiving a downlink signal, which is received by a user equipment in an eNode B cooperative wireless communication system and apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of receiving a downlink signal, which is received by a user equipment in an eNode B cooperative wireless communication system and an apparatus therefor in the following description based on the discussion mentioned earlier in the foregoing description.

Technical Solution

To achieve these and other advantages and in accordance with the purpose of the present invention, as embodied and broadly described, according to one embodiment, a method of receiving a downlink signal, which is received by a user equipment from a plurality of eNode Bs in a wireless communication system includes the steps of receiving downlink scheduling information from a first eNode B and receiving a downlink data signal from the first eNode B and one or more second eNode Bs using the downlink scheduling information, wherein the downlink data signal received from each of the first eNode B and the one or more second eNode Bs is received on an identical frequency band.

In this case, if the downlink scheduling information includes a carrier indicator field, the carrier indicator field can indicate a predetermined carrier. Or, the carrier indicator field may indicate a mapping relation between a plurality of the eNode Bs and a codeword transmitted from each of a plurality of the eNode Bs.

Preferably, the downlink data signal received from each of the first eNode B and the one or more second eNode Bs is classified by a spatial resource.

More preferably, the method further includes the step of receiving corresponding beamforming information from each of the one or more second eNode Bs.

To further achieve these and other advantages and in accordance with the purpose of the present invention, according to a different embodiment, a user equipment in a wireless communication system includes a radio communication module configured to receive a signal from a plurality of eNode Bs and a processor configured to process the signal, if downlink scheduling information is received from a first eNode B among a plurality of the eNode Bs, the processor configured to control the radio communication module to receive a downlink data signal from the first eNode B and one or more second eNode Bs among a plurality of the eNode Bs using the downlink scheduling information, wherein the downlink data signal received from each of the first eNode B and the one or more second eNode Bs is received on an identical frequency band.

Preferably, the reception module is configured to receive corresponding beamforming information from each of the one or more second eNode Bs.

Advantageous Effects

According to embodiment of the present invention, a user equipment can efficiently receive a downlink signal from a plurality of eNode Bs in an eNode B cooperative wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 13 is a diagram of a structure of a general DCI format 2C and FIG. 14 is a diagram for an example that an RA bit of a DCI format 2C is configured in a manner of being divided into two parts according to a second embodiment of the present invention;

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition.

Figure 1:
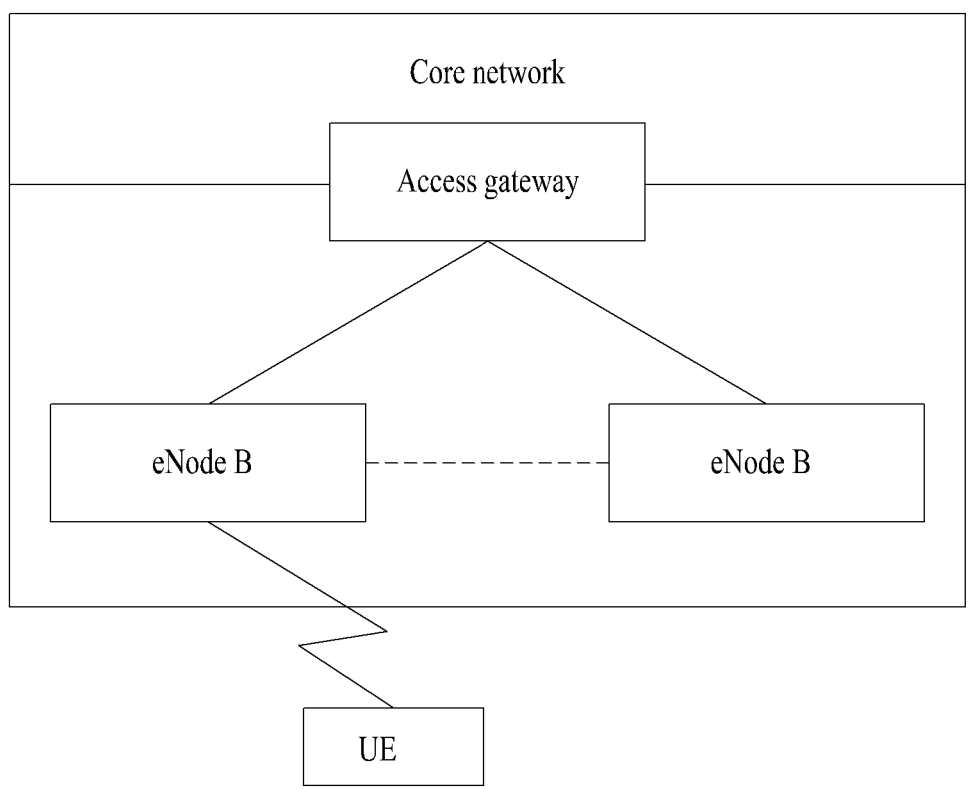
FIG. 1 is a schematic diagram of E-UMTS network structure as one example of a wireless communication system.
Figure 2:
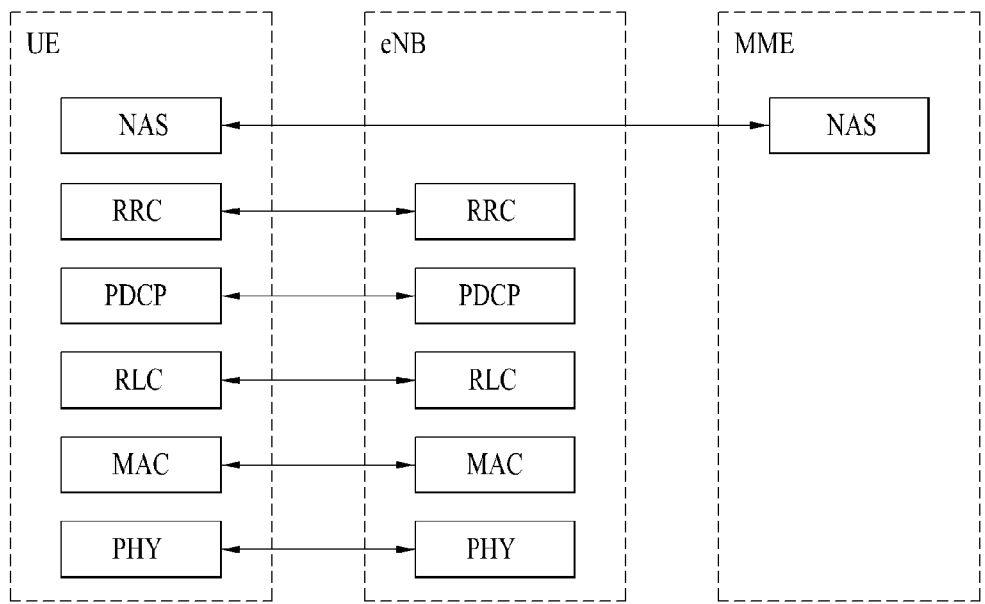
FIG. 2 is a diagram for structures of control and user planes of radio interface protocol between a 3GPP radio access network standard-based user equipment and E-UTRAN.
Figure 2:
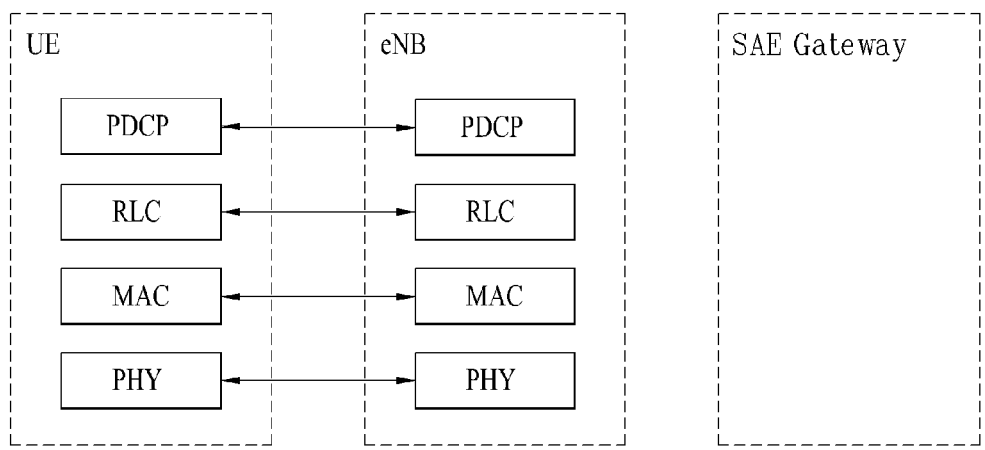

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
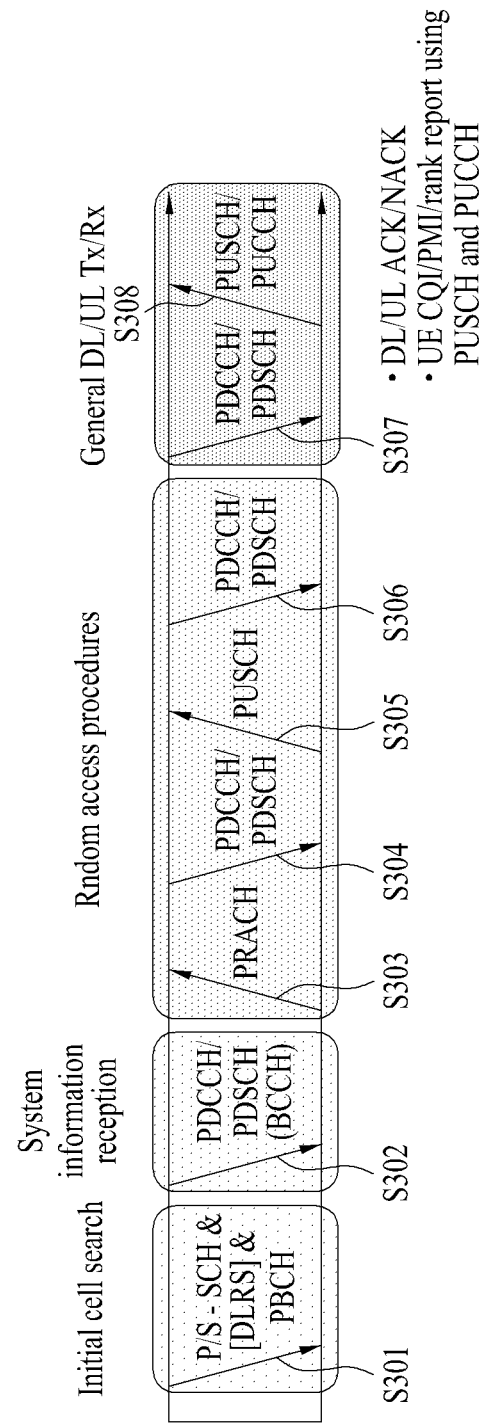
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
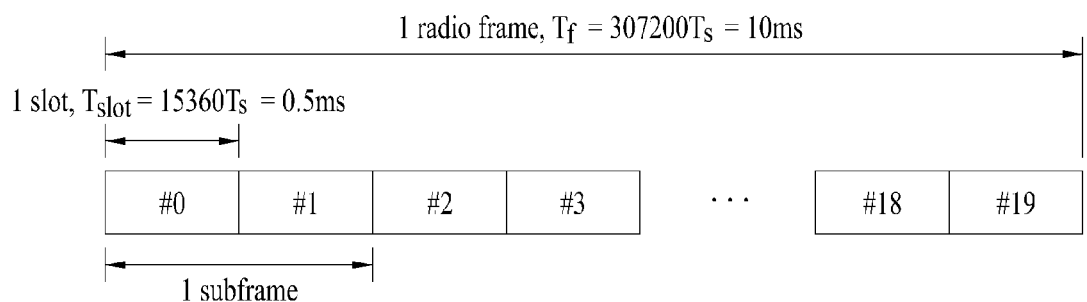
FIG. 4 is a diagram for a structure of a radio frame in LTE system.

FIG. 4 is a diagram for a structure of a radio frame used in an LTE system.

Referring to FIG. 4, one radio frame has a length of 10 ms (327,200×$T_S$) and is constructed with 10 subframes in equal size. Each of the subframes has a length of 1 ms and is constructed with two slots. Each of the slots has a length of 0.5 ms (15,360×$T_S$). In this case, $T_s$ indicates a sampling time and is represented as $T_s$=1/(15 kHz×2048)=3.2552×10$^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
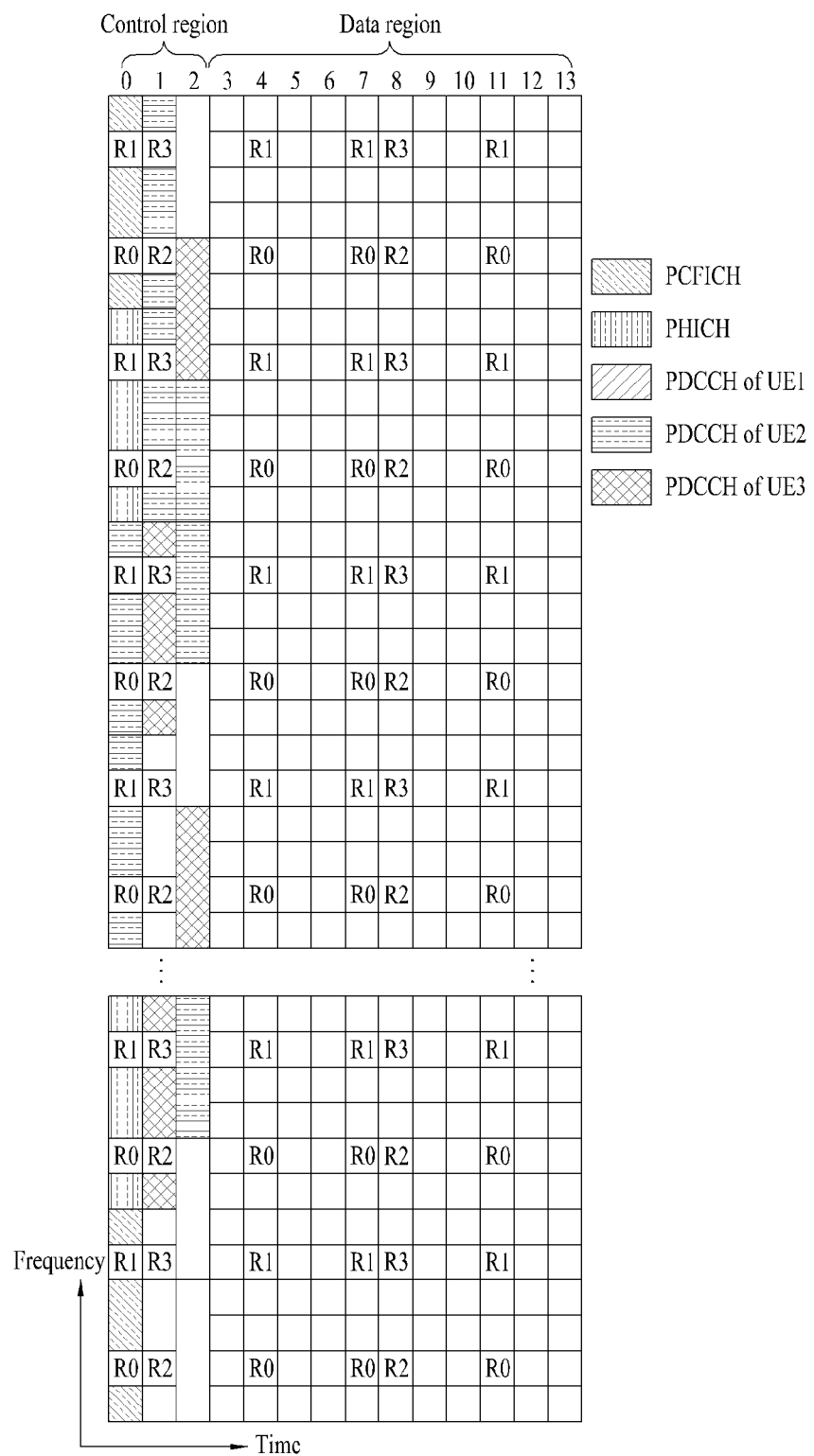
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PC-FICH), a physical hybrid-ARQ indicator channel (PHICH), a physical downlink control channel (PDCCH) and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information indicating which user equipment (one or a plurality of user equipments) receives data of PDSCH and how a plurality of the user equipments receive and decode the PDSCH data and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
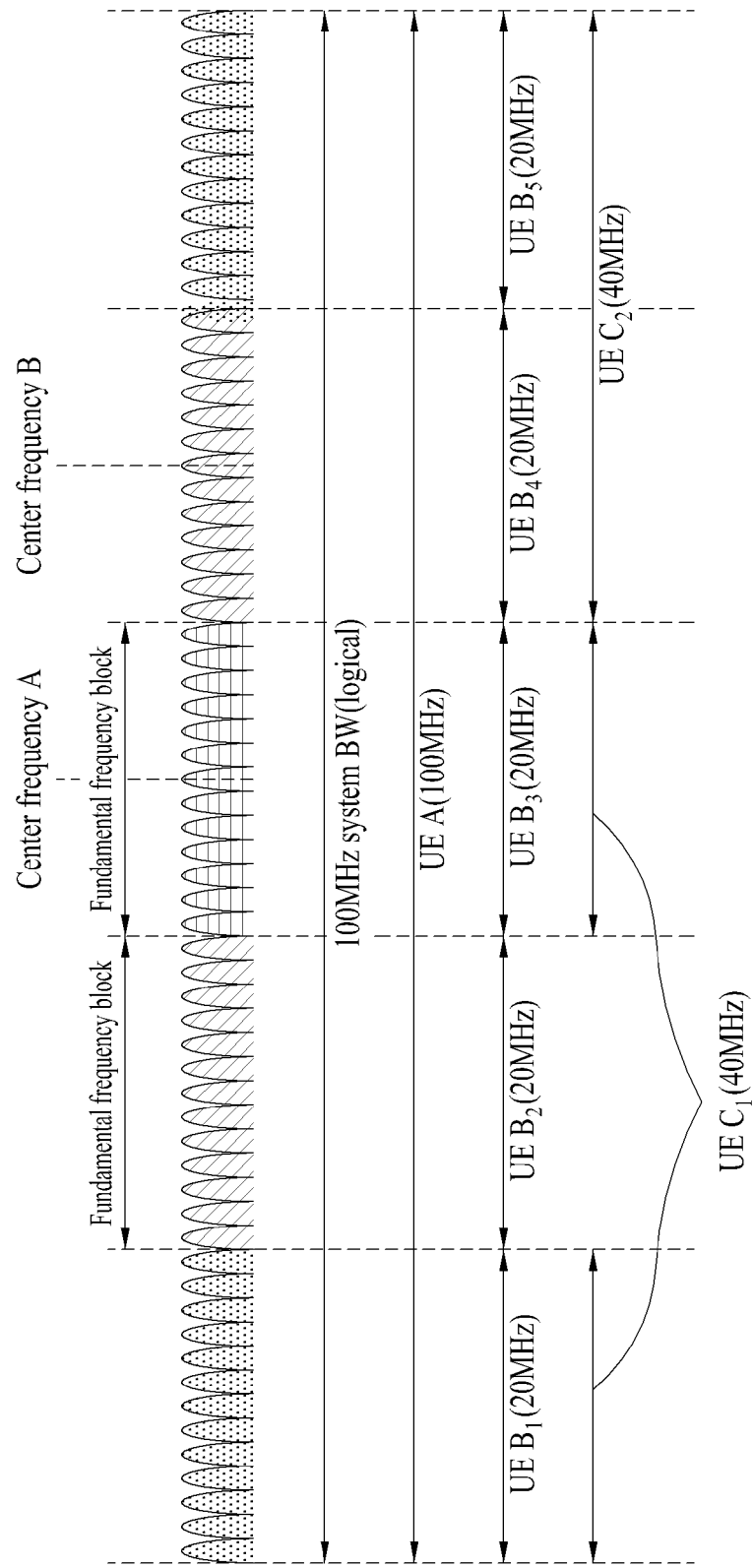
FIG. 6 is a conceptual diagram for explaining a carrier aggregation scheme.

In the following description, a carrier aggregation scheme is explained. FIG. 6 is a conceptual diagram for explaining a carrier aggregation scheme.

A carrier aggregation means a technology using one big logical frequency band in a manner that a user equipment uses a frequency block configured with an uplink resource (or a component carrier) and/or a downlink resource (or a component carrier) or a plurality of cells (of logical meaning) in order for a wireless communication system to use a wider frequency band. For clarity, a terminology of 'component carrier' is consistently used in the following description.

Referring to FIG. 6, a total system bandwidth (system BW) may have a system bandwidth up to maximum 100 MHz as a logical bandwidth. The total system bandwidth includes five component carriers and each of the component carriers may have up to maximum 20 MHz. The component carrier includes at least one physically contiguous subcarrier. Although each of the component carriers in FIG. 6 is depicted as including a bandwidth identical to each other, this is exemplary only. Each of the component carriers may be able to have a bandwidth different from each other. And, although each of the component carriers is depicted as it is adjacent to each other in frequency domain, since the diagram is depicted in terms of a logical concept, each of the component carriers may be physically adjacent to each other or may be apart from each other.

A center frequency can be differently used for each of the component carriers or a common center frequency can be used for the component carriers physically adjacent to each other. As an example, in FIG. 6, if assumed that all component carriers are physically adjacent to each other, a center frequency 'A' can be used. Or, if assumed that each of the component carriers is not physically adjacent to each other, such a separate center frequency as a center frequency 'A', a center frequency 'B' or the like can be used for each of the component carriers.

In the present specification, a component carrier may correspond to a system bandwidth of a legacy system. By defining the component carrier on the basis of the legacy system, it may become easy to provide backward compatibility and to design a system in a radio communication environment at which an evolved UE and a legacy UE coexist. As an example, in case that LTE-A system supports a carrier aggregation, each of the component carriers may correspond to a system bandwidth of LTE system. In this case, the component carrier may have a prescribed bandwidth among the bandwidths of 1.25 MHz, 2.5 MHz, 5 MHz, 10 MHz, or 20 MHz.

In case that a total system bandwidth is expanded by a carrier aggregation, a frequency band used for communicating with each UE is defined by a component carrier unit. A UE A may use 100 MHz corresponding to the total system bandwidth and performs a communication in a manner of using all of the five component carriers. A UE $B_1 \sim B_5$ can use a bandwidth of 20 MHz only and performs a communication by using one component carrier. A UE $C_1$ and a UE $C_2$ can use a bandwidth of 40 MHz and performs a communication by using two component carriers, respectively. The two component carriers may or may not be logically/physically adjacent to each other. The UE $C_1$ indicates a case that the UE $C_1$ uses two component carriers not adjacent to each other and the UE $C_2$ indicates a case that the UE $C_2$ uses two component carriers adjacent to each other.

LTE system uses one DL component carrier and one UL component carrier. On the other hand, LTE-A system may use a plurality of component carriers as depicted in FIG. 6. In this case, a scheme of scheduling a data channel, which is scheduled by a control channel, can be divided into a conventional linked carrier scheduling scheme and a cross carrier scheduling scheme.

More specifically, in case of the linked carrier scheduling scheme, similar to a legacy LTE system using a single component carrier, a control channel transmitted on a specific component carrier schedules a data channel only via the specific component carrier.

Meanwhile, in case of the cross carrier scheduling, a control channel transmitted on a primary component carrier (primary CC) schedules a data channel transmitted on the primary component carrier or a different component carrier using a carrier indicator field (CIF).

Figure 7:
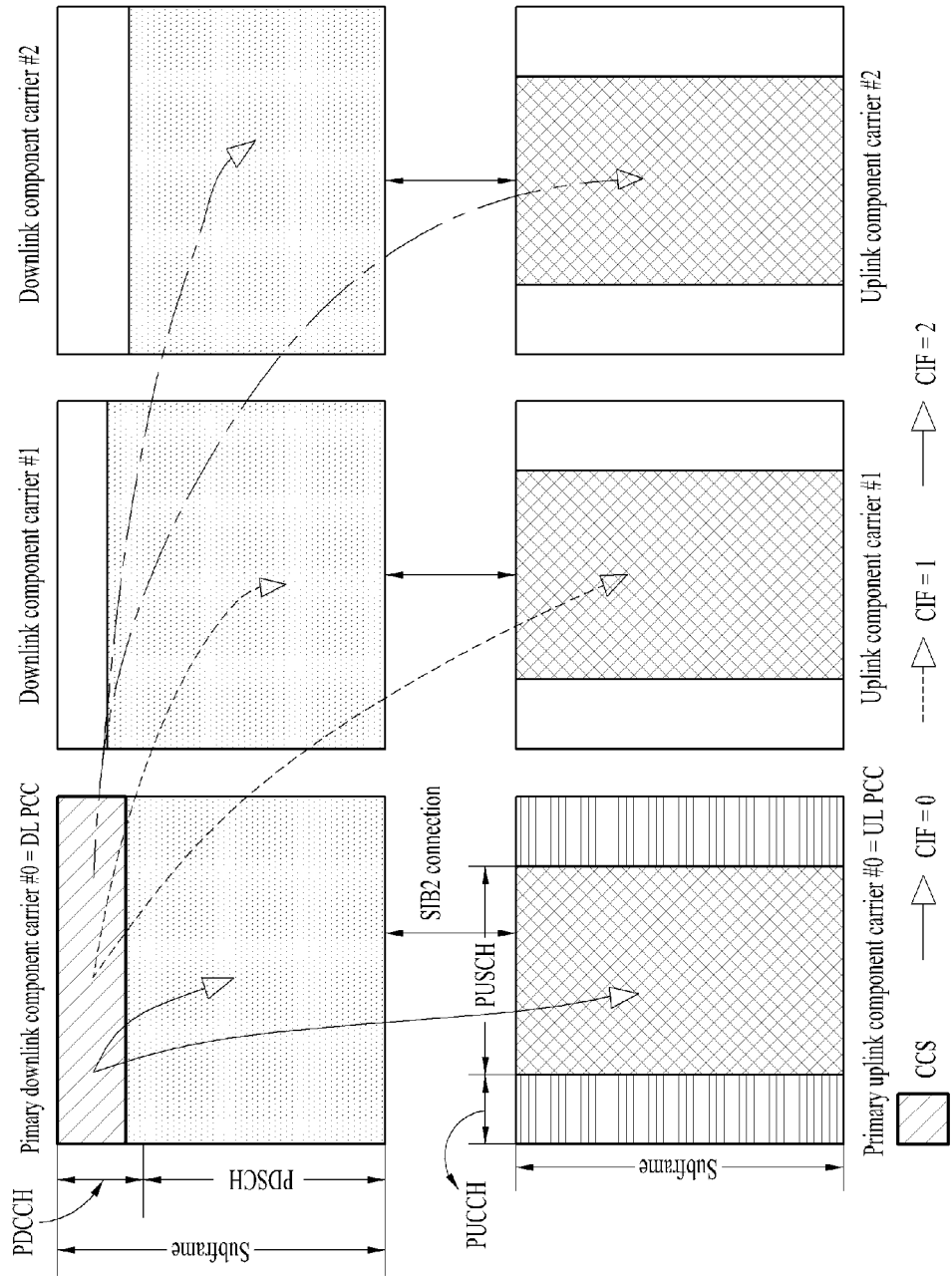
FIG. 7 is a diagram of an example to which a cross carrier scheduling scheme is applicable.

FIG. 7 is a diagram of an example to which a cross carrier scheduling scheme is applicable. In particular, the number of cell (or, a component carrier) assigned to a relay node corresponds to 3 in FIG. 7. As mentioned in the foregoing description, the cross carrier scheduling is performed using a CIF. In this case, assume that a DL cell (or, a component carrier) #A is a primary DL component carrier (i.e., a primary cell (PCell)) and a component carrier #B and a component carrier #C are secondary component carriers (i.e., secondary cell (Scell)).

Meanwhile, it is expected that a LTE-A system, which is a standard of a next generation mobile communication system, will support a CoMP (coordinated multi point) transmission scheme, which is not supported by the conventional standard, to enhance a data transfer rate. In this case, the CoMP transmission scheme is a transmission scheme for two or more eNode Bs or cells to communicate with a user equipment in a manner of cooperating with each other to enhance a communication performance between the user equipment situated at a radio shadow zone and the eNode B (a cell or a sector).

The CoMP transmission scheme can be classified into a join processing (CoMP-joint processing, CoMP-JP) scheme of a cooperative MIMO form via data sharing and a coordinated scheduling/beamforming (CoMP-coordinated scheduling/beamforming, CoMP-CS/CB) scheme.

According to the joint processing (CoMP-JP) scheme in DL, a user equipment may be able to instantaneously receive data simultaneously from each of the eNode Bs performing the CoMP transmission scheme. And, a reception performance can be enhanced in a manner of combining signals received from each of the eNode Bs (joint transmission (JT)). And, it may be able to consider a method for one of the eNode Bs performing the CoMP transmission scheme to transmit data to the user equipment on a specific timing point (DPS; dynamic point selection). On the other hand, according to the coordinated scheduling/beamforming method (CoMP-CS/CB), the user equipment may be able to instantaneously receive data from a single eNode B, i.e., a serving eNode B, via a beamforming.

According to the joint processing (CoMP-JP) scheme in UL, each of the eNode Bs may be able to simultaneously receive PUSCH signal from the user equipment (joint reception (JR)). On the other hand, according to the coordinated scheduling/beamforming scheme (CoMP-CS/CB), only a single eNode B may be able to receive PUSCH. In this case, a decision on whether to use the coordinated scheduling/beamforming scheme is determined by the coordinating cells (or eNode Bs).

Meanwhile, the CoMP scheme is applicable to not only a homogenous network consisted of a macro eNB only but also a heterogeneous network.

Figure 8:
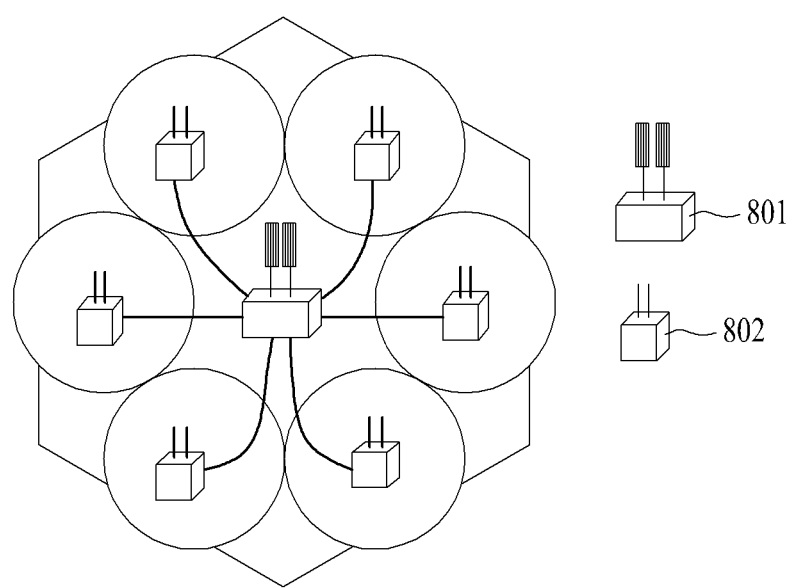
FIG. 8 is a diagram for an example of a structure of a heterogeneous network to which a CoMP scheme is applicable.

FIG. 8 is a diagram for an example of a structure of a heterogeneous network to which a CoMP scheme is applicable. In particular, FIG. 8 depicts a network consisted of RRHs (radio remote head) and the like 802 transceiving a signal with a macro eNB 801 with a relatively low transmit power. In this case, a pico eNB or the RRH positioned within coverage of the macro eNB can be connected to the macro eNB with an optical cable and the like. And, the RRH may be called a micro eNB.

Referring to FIG. 8, since transmit power of such a micro eNB as the RRH is relatively lower than the transmit power of a macro eNB, coverage of each of the RRHs is relatively smaller than the coverage of the macro eNB.

Unlike a system at which a legacy macro eNB exist only, what a CoMP scenario intends to seek is to cover a coverage hole of a specific region via the RRHs added to a system or to increase a total system throughput via a cooperative transmission in a manner of utilizing a plurality of transmission points (TP) including the RRH and the macro eNB.

Meanwhile, in FIG. 8, the RRHs can be classified into two types. One type corresponds to a case that each of the RRHs receives a cell ID different from that of the macro eNB. Hence, each of the RHHs can be regarded as a small cell different from the macro eNB, respectively. Another type may correspond to a case that each of the RRHs operates in a manner of having a cell ID identical to that of the macro eNB.

In case that each of the RRHs and the macro eNB has a cell ID different from each other, a UE recognizes each of the RRHs and the macro eNB as an independent cell, respectively. In this case, the UE located at a boundary of each cell is severely interfered by a neighboring cell. In order to reduce the interference and to increase transfer rate, various kinds of CoMP schemes have been proposed.

Subsequently, in case that each of the RRHs and the macro eNB are provided with a cell ID identical to each other, as mentioned earlier, a UE recognizes each of the RRHs and the macro eNB as a single cell. The UE receives data from each of the RRHs and the macro eNB. In case of a data channel, a precoding, which is used to transmit data of each UE, is simultaneously applied to a reference signal as well. Hence, each UE can estimate a practical channel of its own on which the data is transmitted. In this case, the reference signal to which the precoding is applied corresponds to the aforementioned DM-RS.

While a single PDCCH is transmitted by a primary transmission point (PTP), the aforementioned CoMP scheme is considering a method of transmitting scheduling information of one or more secondary transmission points (STP) as well as scheduling information of the primary transmission point using the single PDCCH only.

Figure 9:
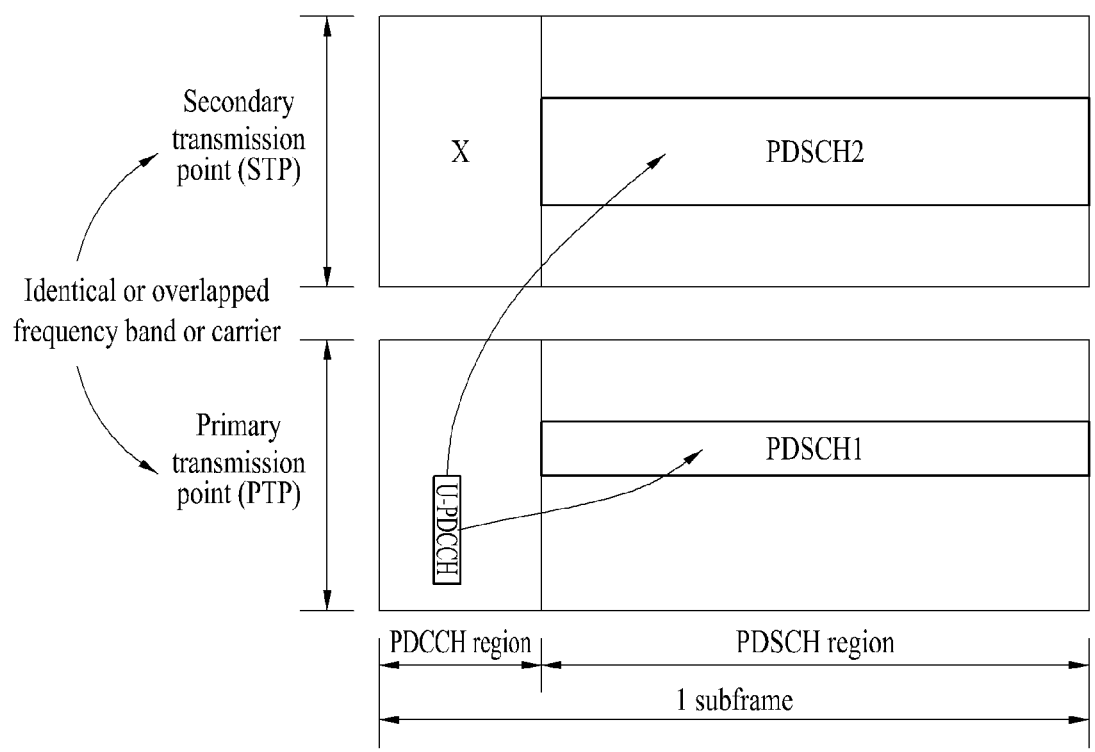
FIG. 9 is a diagram of an example that a downlink scheduling grant of a secondary transmission point is transmitted from a primary transmission point when a CoMP scheme is applied.

FIG. 9 is a diagram of an example that a downlink scheduling grant of a secondary transmission point is transmitted from a primary transmission point when a CoMP scheme is applied. In particular, FIG. 9 exemplifies a case that each transmission point transmits PDSCH via a single layer only.

Referring to FIG. 9, it is able to know that two PDSCHs (i.e., PDSCH 1 and PDSCH 2) are scheduled using a single PDCCH, i.e., a U-PDCCH (universal PDCCH), which is transmitted via a PDCCH region of a primary transmission point. Unlike a legacy PDCCH, it is preferable to design the U-PDCCH to enable the U-PDCCH to schedule two PDSCHs on an identical frequency band. In this case, although the U-PDCCH can be configured as identical to the legacy PDCCH, the U-PDCCH may have a format different from each other depending on an applied CoMP scheme.

Meanwhile, in case that a plurality of PDSCHs are transmitted from a plurality of transmission points on an identical carrier using a plurality of layers, in terms of a transmission band, it can be classified into cases as follows 1) a corresponding resource region is assigned in a manner of being completely overlapped 2) a corresponding resource region is assigned in a manner of being partly overlapped, or 3) a corresponding resource region is assigned to a completely exclusive region. How to implement the CoMP scheme depending on each of the cases is described in terms of a configuration of DL control information (i.e., DCI format) included in PDCCH. And, correlation between a carrier aggregation scheme applied to a legacy LTE-A system and the CoMP scheme is described and then how to modify and apply the carrier aggregation scheme to the CoMP scheme is explained in the following description.

Embodiment 1

Figure 10:
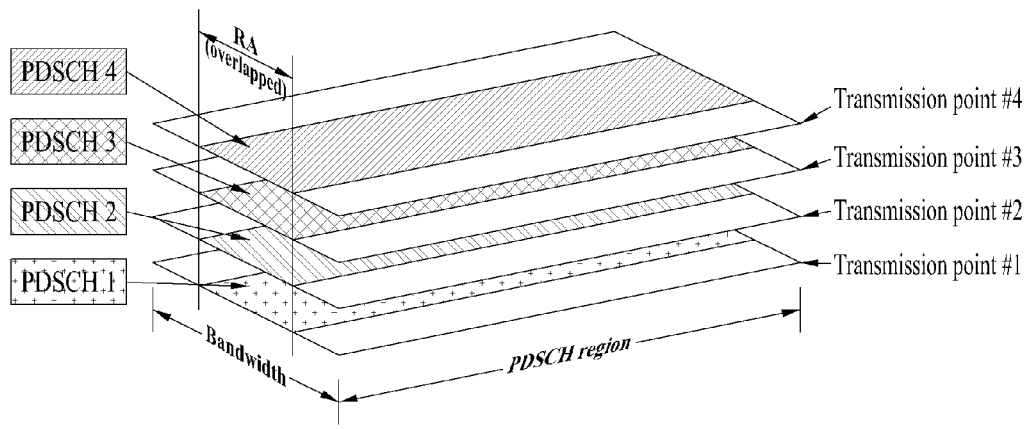
FIG. 10 is a diagram for an example that an identical frequency domain is assigned to PDSCH transmission of a plurality of transmission points according to a first embodiment of the present invention.

A Case that a Resource Allocated to Transmission Points is Completely Overlapped FIG. 10 is a diagram for an example that an identical frequency domain is assigned to PDSCH transmission of a plurality of transmission points according to a first embodiment of the present invention.

Referring to FIG. 10, according to a multi-point transmission scheme or the CoMP scheme transmitting PDSCH to an identical frequency domain (RB) from a plurality of transmission points, PDCCH 1 transmitted from a primary transmission point, i.e., a resource allocation field (RA field) included in a DCI format, can be shared by PDSCH 2 to PDSCH 4. In this case, if it is assumed that one DCI format simultaneously informs resource allocation information of a plurality of the transmission points, it is not necessary to add separate information for DL scheduling information of a different transmission point to the DCI format.

Figure 11:
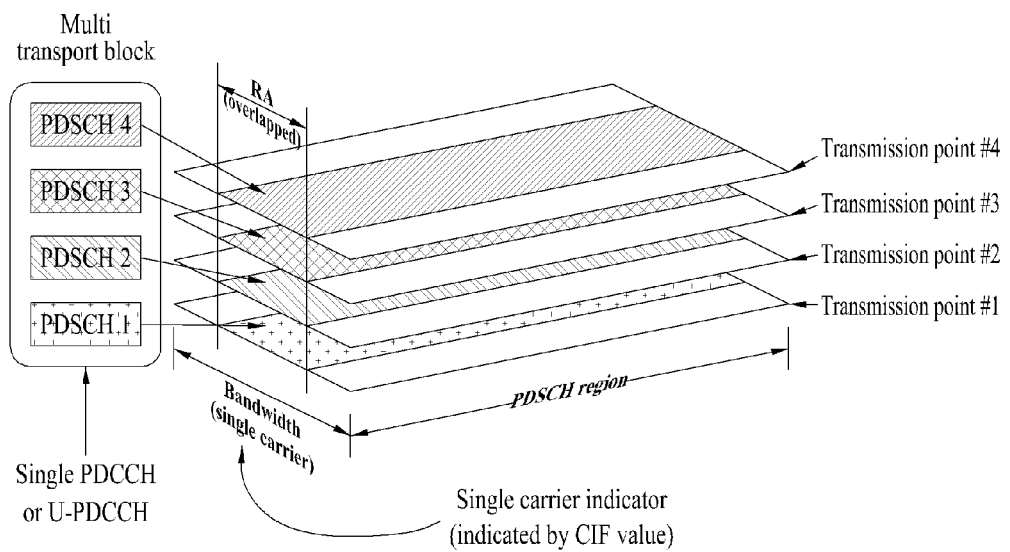
FIG. 11 is a diagram for a different example that an identical frequency domain is assigned to PDSCH transmission of a plurality of transmission points according to a first embodiment of the present invention.

FIG. 11 is a diagram for a different example that an identical frequency domain is assigned to PDSCH transmission of a plurality of transmission points according to a first embodiment of the present invention.

Referring to FIG. 11, if a carrier aggregation is applied and the DCI format, which is used in a cross carrier scheduling, is used, it is able to configure a carrier indicator field (CIF) value to indicate an identical carrier and able to configure to use a single PDCCH only instead of using a plurality of PDCCHs. In this case, it is able to perform an operation of scheduling a plurality of PDSCHs, which are transmitted from a plurality of transmission points via an identical carrier, using an identical DCI format. And, as depicted in FIG. 11, although a plurality of the PDSCHs are assigned to an identical resource block, since a plurality of the PDSCHs are spatially multiplexed, it is able to implement to normally receive the PDSCHs according to a layer or a codeword.

In particular, unlike a general carrier aggregation scheme, according to the present invention, a single PDCCH can schedule one or more PDSCHs (a codeword, a layer, or a transport block) existing in a plurality of carriers or a plurality of cells. According to a general cross carrier scheduling scheme, PDCCHs for each of scheduled carriers are transmitted on a single carrier. Unlike a case that a carrier aggregation is not applied, according to the present invention, a plurality of PDSCHs (a codeword, a layer, or a transport block) can be scheduled on a single carrier. In this case, such a process (e.g., multiplexing chain) as transmitting a plurality of the PDSCHs in cells different from each other is underwent. As a result, a cell-specific parameter is differently applied in a PDSCH generation process.

In addition, due to a similarity with a cross carrier scheduling, a legacy DCI format can be reused. Hence, in case of using a DCI format including a CIF field, detailed information on a layer, a codeword, or the like used for each transmission point may be informed by a CIF. Of course, this is limited to a case that the CIF is not used for a special usage. Of course, the detailed information can be informed by configuring a separate bit field.

1) Meanwhile, among the CoMP scheme, if the proposed scheme is applied to a JT (joint transmission) mode simultaneously transmitting an identical signal in transmission points different from each other, a soft handover or a virtual handover can be easily implemented between limited cells. In case of the CoMP scheme, basically, one PDCCH is received from a primary (serving) cell and a plurality of cells attempt to perform a transmission based on the PDCCH. In this case, the soft handover can be easily implemented by switching a role of the primary (serving) cell to a different cell participating in the JT mode. This sort of handover can be easily performed by changing the primary (serving) cell only without adding a special operation or a procedure since a plurality of the cells are already performing the JT mode in a manner of being organically combined with each other. Basically, a cell of a strong signal is more likely to be selected as the primary (serving) cell. Yet, the primary cell may also be determined by a different condition. And, the change of the primary (serving) cell can be implemented by an RRC reconfiguration process or a dynamic change by a signal of a physical layer. Or, the change of the primary (serving) cell can be implemented by a combination of an RRC signaling and a physical layer signal (or MAC layer signal).

2) Moreover, if the DCI format including the CIF is used for the CoMP scheme, the CoMP scheme may correspond to a sort of a generalized carrier aggregation scheme. Yet, in case that the DCI format including the CIF is applied to the CoMP scheme, since the CoMP scheme is assumed to be operated based on a single carrier, the CIF is not used for a general purpose. Hence, the CIF can be used to indicate a codeword or a transport block in the CoMP scheme. For instance, the CIF can be used for a purpose of informing a mapping relation between a codeword and a cell in a case that a codeword 1 is transmitted from the primary (serving) cell and a codeword 2 is transmitted from a cooperative cell, a case that no transmission from a cooperative cell and the codeword 1 or the codeword 2 is transmitted from the primary (serving) cell only, or the like.

Table 1 to Table 7 exemplifies a mapping relation capable of being indicated by a CIF value or separately defined bit information between a codeword and a cell. In particular, Table 1 to Table 3 exemplifies a mapping relation between a codeword and a cell when two cells transmit two codewords, respectively. In this case, a size of a CIF or separately defined bit information corresponds to 2 bits. Subsequently, Table 4 and Table 5 exemplify a mapping relation between a codeword and a cell when three cells transmit three codewords, respectively. In this case, a size of a CIF or separately defined bit information corresponds to 3 bits. Lastly, Table 6 and Table 7 exemplify a mapping relation between a codeword and a cell when N numbers of cells transmit n numbers of codewords, respectively. Table 6 indicates a CIF or separately defined bit information of 2 bits in size and Table 7 indicates a CIF or separately defined bit information of 3 bits in size.

TABLE 1

| Indication value/states | Cell 1(TP1) | Cell 2 (TP2) |
| --- | --- | --- |
| 0 | — | — |
| 1 | CW1 | — |
| 2 | — | CW2 |
| 3 | CW1 | CW2 |

TABLE 2

| Indication value/states | Cell 1(TP1) | Cell 2 (TP2) |
| --- | --- | --- |
| 0 | CW1 | — |
| 1 | — | CW2 |
| 2 | CW1 | CW2 |
| 3 | — | — |

TABLE 3

| Indication value/states | Cell 1(TP1) | Cell 2 (TP2) |
| --- | --- | --- |
| 0 | Predetermined CW-to-Cell mapping (Type 0) | |
| 1 | Predetermined CW-to-Cell mapping (Type 1) | |
| 2 | Predetermined CW-to-Cell mapping (Type 2) | |
| 3 | Predetermined CW-to-Cell mapping (Type 3) | |

A predetermined codeword to cell mapping (CW-to-cell mapping) in Table 3 indicates a random mapping relation capable of being defined by a different scheme other than the mapping relation defined in Table 1 and Table 2.

TABLE 4

| Indication value/states | Cell 1(TP1) | Cell 2 (TP2) | Cell 3 (TP3) |
|---|---|---|---|
| 0 | CW1 | — | — |
| 1 | — | CW2 | — |
| 2 | — | — | CW3 |
| 3 | CW1 | CW2 | — |
| 4 | CW1 | — | CW3 |
| 5 | — | CW2 | CW3 |
| 6 | CW1 | CW2 | CW3 |
| 7 | — | — | — |

TABLE 5

| Indication value/states | Cell 1(TP1) | Cell 2 (TP2) | Cell 3 (TP3) |
|---|---|---|---|
| 0 | Predetermined CW-to-Cell mapping (Type 0) | | |
| 1 | Predetermined CW-to-Cell mapping (Type 1) | | |
| 2 | Predetermined CW-to-Cell mapping (Type 2) | | |
| 3 | Predetermined CW-to-Cell mapping (Type 3) | | |
| 4 | Predetermined CW-to-Cell mapping (Type 4) | | |
| 5 | Predetermined CW-to-Cell mapping (Type 5) | | |
| 6 | Predetermined CW-to-Cell mapping (Type 6) | | |
| 7 | Predetermined CW-to-Cell mapping (Type 7) | | |

A predetermined codeword to cell mapping (CW-to-cell mapping) in Table 5 indicates a random mapping relation capable of being defined by a different scheme other than the mapping relation defined in Table 4.

TABLE 6

| Indication value/states | Cell 1 (TP1) | Cell 2 (TP2) | ... | Cell N (TPN) |
|---|---|---|---|---|
| 0 | Predetermined CW-to-Cell mapping (Type 0) | | | |
| 1 | Predetermined CW-to-Cell mapping (Type 1) | | | |
| 2 | Predetermined CW-to-Cell mapping (Type 2) | | | |
| 3 | All CWs | | | |

TABLE 7

| Indication value/states | Cell 1 (TP 1) | Cell 2 (TP2) | ... | Cell N (TPN) |
|---|---|---|---|---|
| 0 | Predetermined CW-to-Cell mapping (Type 0) | | | |
| 1 | Predetermined CW-to-Cell mapping (Type 1) | | | |
| 2 | Predetermined CW-to-Cell mapping (Type 2) | | | |
| 3 | Predetermined CW-to-Cell mapping (Type 3) | | | |
| 4 | Predetermined CW-to-Cell mapping (Type 4) | | | |
| 5 | Predetermined CW-to-Cell mapping (Type 5) | | | |
| 6 | Predetermined CW-to-Cell mapping (Type 6) | | | |
| 7 | Predetermined CW-to-Cell mapping (Type 7) | | | |

3) As a further different important characteristic, if the proposed technique is applied to a UE to which a carrier aggregation scheme is unable to be applied, i.e., the UE not having a carrier aggregation capability, a plurality of cells (or transmission points) can transmit multi-codeword or multi-transport block on a single carrier. Although a legacy UE not having a carrier aggregation capability was able to receive one PDSCH on one PDCCH only, if the proposed technique is applied to the UE, the UE can receive a plurality of PDSCHs using a single PDCCH. Similar to a UE having a carrier aggregation capability, UEs capable of recognizing the proposed scheme can receive a plurality of codewords or transport blocks even though the UEs do not have the carrier aggregation capability.

4) Moreover, the proposed scheme can be applied to a CoMP CS/CB mode as well in a manner of being modified. After a carrier aggregation technique is applied irrespective of whether a UE has a carrier aggregation capability, pluralities of PDCCHs including a CIF are transmitted as it is. Actually, one codeword or a transport block (i.e., PDSCH) is transmitted. The remaining PDCCHs perform a role of informing of coordination scheduling or beamforming information. By transmitting other PDCCHs as well as the PDCCH related to the practically transmitted codeword or transport block, transmission information can be obtained from a cooperative cell when the codeword is demodulated. Hence, reception performance may be enhanced by applying an interference cancellation scheme. In particular, additionally transmitted PDCCH can be sufficiently utilized for interference cancellation information by a receiving end.

Since a single PDCCH is practically transmitted only, it is able to say that this sort of operation inherits a concept of a serving cell PDCCH. Yet, as performed in the CS/CB mode, since it is necessary to perform an additional PDCCH demodulation for interference cancellation, the operation is different from the legacy CoMP scheme in terms of a reception signal processing. Hence, the proposed scheme can be applied to UEs in a manner of dividing the UEs into a UE (advanced UE (A-UE) capable of performing the operation and a UE incapable of performing the operation. In case of applying the carrier aggregation scheme, a scheme for automatically informing the A-UE that a PDCCH transmission of the CS/CB mode may exist can be applied. Of course, in order to indicate the A-UE to perform this operation, separate bit information can be added.

Embodiment 2

A Case that a Resource Allocated to Transmission Points is Partly Overlapped

Figure 12:
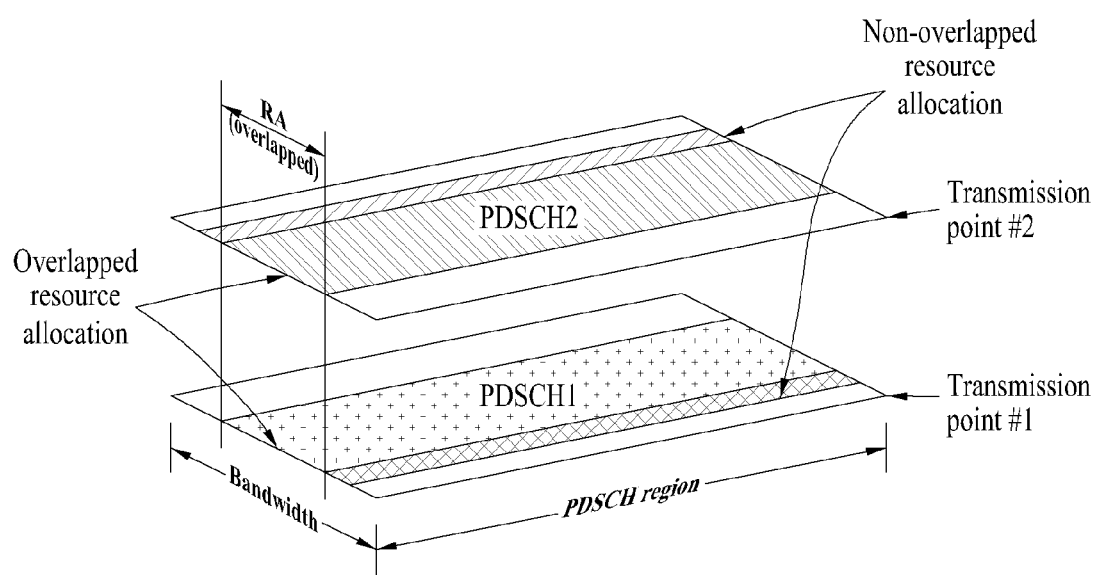
FIG. 12 is a diagram for an example that a partly overlapped frequency domain is assigned to PDSCH transmission of a plurality of transmission points according to a second embodiment of the present invention.

FIG. 12 depicts an example that a partly overlapped frequency domain is assigned to PDSCH transmission of a plurality of transmission points according to a second embodiment of the present invention. In particular, FIG. 12 depicts a case that a part of frequency resource region is dislocated on a frequency domain because PDSCHs transmitted from layers different from each other are assigned to the frequency resource domains, which are not matched with each other.

A method of implementing the second embodiment is to use an individual PDCCH for each transmission point or to configure a plurality of RA bits for a single PDCCH. Yet, this approach has a drawback that a size of a PDCCH DCI format increases as much as the individual PDCCH or a plurality of the RA bits.

If the CoMP scheme is configured or is judged as being configured, another method of implementing the second embodiment is to configure an RA bit of a DCI format in a manner of dividing the RA bit of a DCI format into two parts and then to differently comprehend a bit field of each of the two part. It shall be described in more detail with reference to drawing.

FIG. 13 is a diagram for a structure of a general DCI format 2C and FIG. 14 is a diagram for an example that an RA bit of a DCI format 2C is configured in a manner of being divided into two parts according to the second embodiment of the present invention. In this case, the DCI format 2C indicates downlink control information transmitted to a user equipment by an eNode to perform a downlink transmission with maximum 8 layers.

In FIG. 13 and FIG. 14, a ceil (N/P) indicates an RA bit. In this case, N indicates a downlink bandwidth represented by the number of resource block and P indicates the number of resource block included in a resource block group.

Referring to FIG. 13, it is able to know that a single RA bit represented by the ceil (N/P) is included only. Referring to FIG. 14, it is able to know that two RA bits, i.e., an RA 1 and an RA 2, represented by the ceil (N/P) are included. As depicted in diagrams, it is able to configure an RA bit as the RA 1 and the RA 2, indicate a whole region using the RA 1 and indicate an overlapped region using the remaining RA 2. More specifically, assume that a layer 1 contiguously allocates resources from an RB #10 to an RB #30 and a layer 2 contiguously allocates resources from an RB #20 to an RB #40. In this case, it is able to configure that the RA 1 indicates the whole region from the RB #10 to the RB #40 and the RA 2 indicates an overlapped region from the RB #20 to the RB #30. In case of a non-contiguous resource allocation, it is able to configure bit information to make the RA 1 indicate a value corresponding to the sum of the two RAs and the RA 2 indicate an overlapped region. A basic assumption to apply the aforementioned method corresponds to a case that a part of region is exclusively configured while most of region has an overlapped resource region. For instance, in case that a 20 MHz band is used for a specific layer and a 15 MHz resource is allocated to a different layer, i.e., in case that 75% are overlapped and 25% is occupied by a single layer only, a total RA bit size can be reduced using the proposed method.

Figure 15:
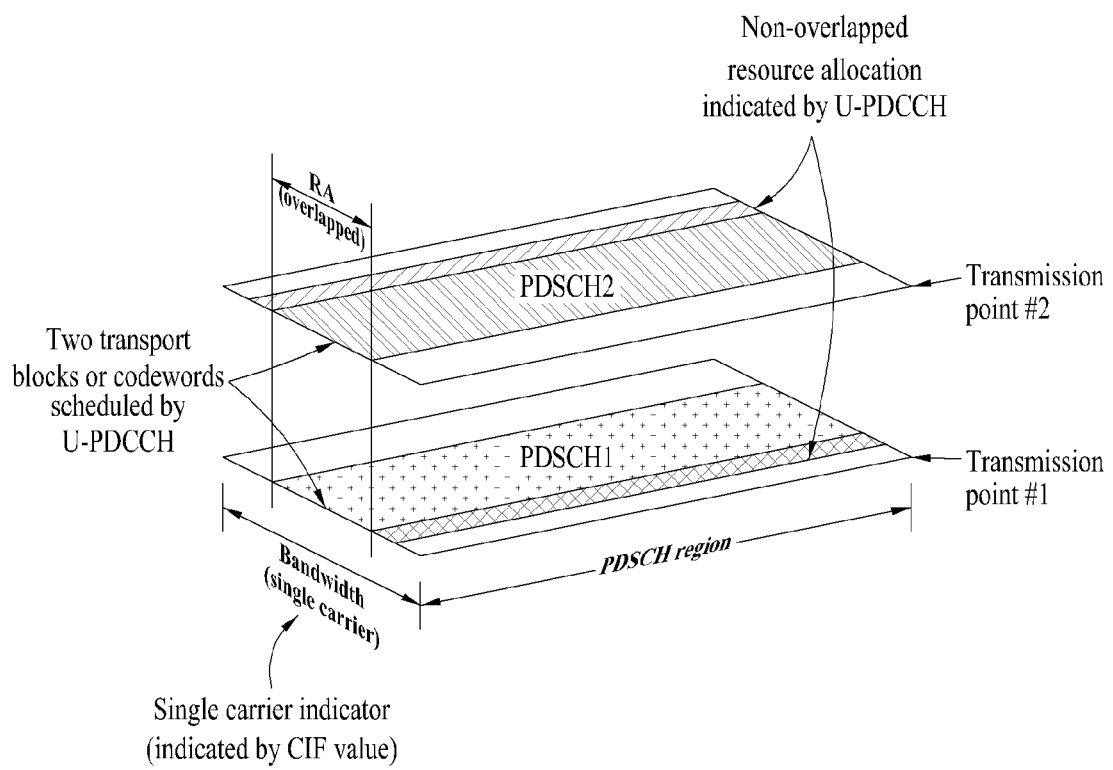
FIG. 15 is a diagram for a different example that a partly overlapped frequency domain is assigned to PDSCH transmission of a plurality of transmission points according to a second embodiment of the present invention.

FIG. 15 is a diagram for a different example that a partly overlapped frequency domain is assigned to PDSCH transmission of a plurality of transmission points according to a second embodiment of the present invention.

As depicted in FIG. 15, a plurality of transmission points transmits a plurality of PDSCHs using spatial domains different from each other, i.e., layers different from each other using a single U-PDCCH only. Hence, this can be regarded as the CoMP operation. Or, it is able to schedule a plurality of PDSCHs on a single carrier using a plurality of PDCCHs in a manner of configuring a CIF to intentionally indicate an identical carrier by using a CIF field used in a cross carrier scheduling of LTE-A system. This can be also regarded as another modified form of the CoMP operation. In this case, the PDSCHs transmitted from each of the transmission points can be generated by cell-specific parameters different from each other. By doing so, since it can be regarded as identical to the PDSCHs transmitted from cells different from each other, it is not necessary to design an inter-transmission point corresponding CSI.

In the second embodiment of the present invention, the 1) to 4) mentioned earlier in the first embodiment, i.e., a soft handover issue, a codeword-to-cell mapping issue, an issue for a UE not having a carrier aggregation capability, and interference cancellation issue in the CS/CB mode, and the like can be identically applied to the second embodiment as well.

Embodiment 3

A Case that a Resource Allocated to Transmission Points is Not Overlapped

Figure 16:
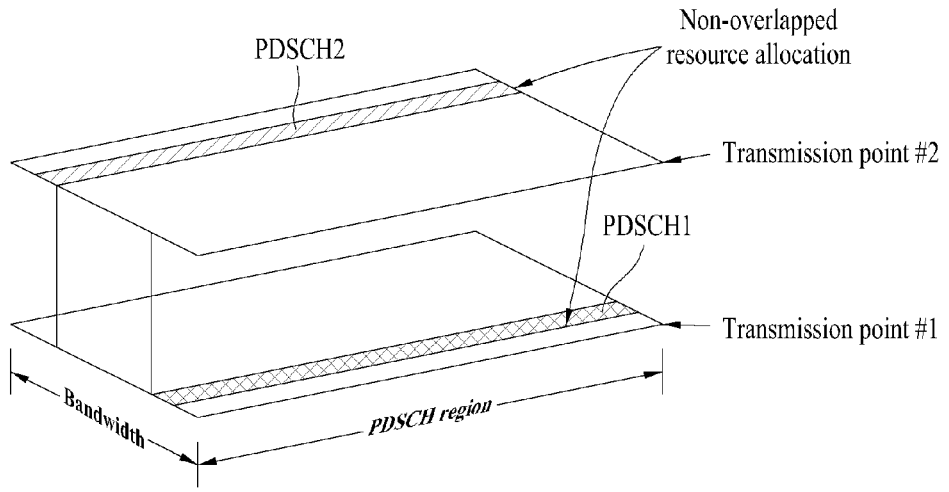
FIG. 16 is a diagram for an example that a frequency domain not overlapped is assigned to PDSCH transmissions of a plurality of transmission points according to a third embodiment of the present invention.

FIG. 16 is a diagram for an example that a frequency domain not overlapped is assigned to PDSCH transmissions of a plurality of transmission points according to a third embodiment of the present invention. In particular, FIG. 16 depicts a case that each transmission point transmits a single codeword with a single layer.

Referring to FIG. 16, since there is no resource region being overlapped, it is able to preferentially consider a method of using PDCCH of each of the transmission points to inform of an RA of each of the transmission points. Yet, it may also be able to configure a single U-PDCCH including a plurality of RAs as an alternative.

After a cross carrier scheduling is configured to be performed, if a CIF value is configured to intentionally indicate a single carrier, it is able to implement as like a plurality of PDCCHs schedule a plurality of PDSCHs on a single carrier (or a cell). As mentioned in the foregoing description, this is different from the cross carrier scheduling scheme using a plurality of carriers.

Figure 17:
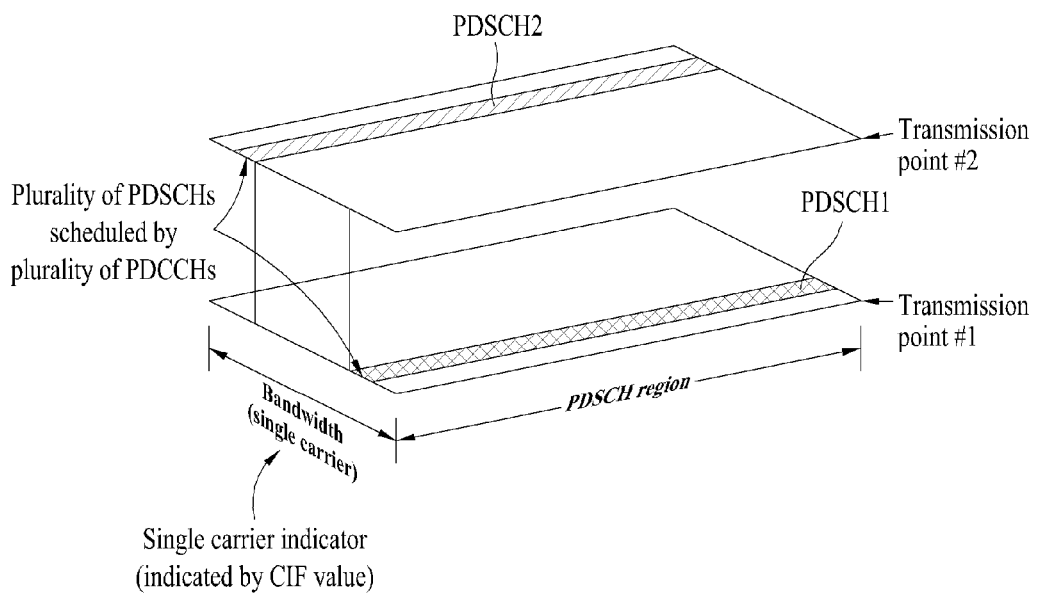
FIG. 17 is a diagram for a different example that a frequency domain not overlapped is assigned to PDSCH transmissions of a plurality of transmission points according to a third embodiment of the present invention.

FIG. 17 is a diagram for a different example that a frequency domain not overlapped is assigned to PDSCH transmissions of a plurality of transmission points according to a third embodiment of the present invention. In particular, FIG. 17 depicts an example of scheduling two PDSCHs transmitted on a single carrier using two PDCCHs.

Referring to FIG. 17, in case of reusing a DCI format including a CIF field, a single carrier transmission transmitting two PDSCHs on a single carrier can be implemented in a manner of configuring a CIF value to indicate an identical carrier.

In the third embodiment of the present invention, the 1) to 4) mentioned earlier in the first embodiment, i.e., a soft handover issue, a codeword-to-cell mapping issue, an issue for a UE not having a carrier aggregation capability, and interference cancellation issue in the CS/CB mode, and the like can be identically applied to the third embodiment as well.

Meanwhile, although a codeword, a transport block, PDSCH, and the like have inherited a concept of 3GPP LTE and LTE-A, meaning of them can be comprehended as such a general data transmission as a transmission packet. And, although a transmission point has inherited 3GPP CoMP scheme, as mentioned in the foregoing description, the transmission point can be comprehended as a concept of a cell. The transmission point may be comprehended as a component carrier, an RRH, and a relay node as well.

Figure 18:
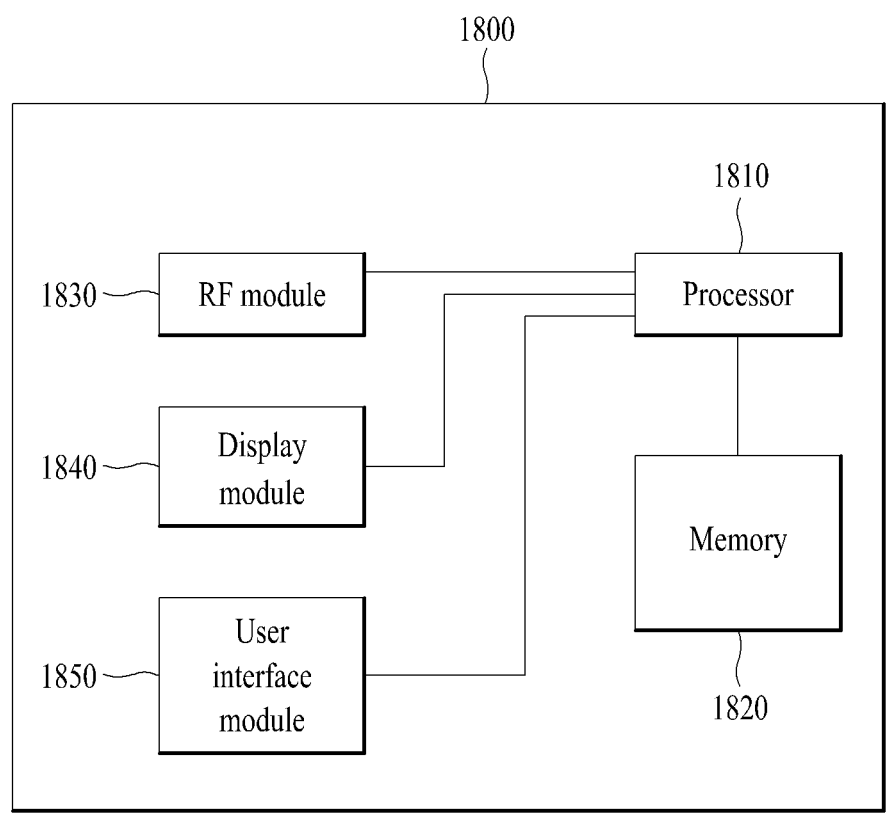
FIG. 18 is a block diagram of an example for a communication device according to one embodiment of the present invention.

FIG. 18 is a block diagram of an example for a communication device according to one embodiment of the present invention.

Referring to FIG. 18, a communication device 1800 may include a processor 1810, a memory 1820, an RF module 1830, a display module 1840, and a user interface module 1850.

Since the communication device 1800 is depicted for clarity of description, prescribed module(s) may be omitted in part. The communication device 1800 may further include necessary module(s). And, a prescribed module of the communication device 1800 may be divided into subdivided modules. A processor 1810 is configured to perform an operation according to the embodiments of the present invention illustrated with reference to drawings. In particular, the detailed operation of the processor 1810 may refer to the former contents described with reference to FIG. 1 to FIG. 17.

The memory 1820 is connected with the processor 1810 and stores an operating system, applications, program codes, data, and the like. The RF module 1830 is connected with the processor 1810 and then performs a function of converting a baseband signal to a radio signal or a function of converting a radio signal to a baseband signal. To this end, the RF module 1830 performs an analog conversion, amplification, a filtering, and a frequency up conversion, or performs processes inverse to the former processes. The display module 1840 is connected with the processor 1810 and displays various kinds of informations. And, the display module 1840 can be implemented using such a well-known component as an LCD (liquid crystal display), an LED (light emitting diode), an OLED (organic light emitting diode) display and the like, by which the present invention may be non-limited. The user interface module 1850 is connected with the processor 1810 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In the present specification, embodiments of the present invention are mainly explained centering on the data transmission and reception between a relay node and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of receiving a downlink signal, which is received by a user equipment in an eNode B cooperative wireless communication system and an apparatus therefor are described with reference to examples applied to 3GPP LTE system, it may be applicable to various kinds of wireless communication systems as well as the 3GPP LTE system.

What is claimed is:

1. A method of receiving a downlink signal from a plurality of cells at a user equipment in a cell cooperative wireless communication system, the method comprising:
   receiving, by the user equipment, downlink control information including downlink scheduling information for a serving cell and one or more coordinating cells at the user equipment from the serving cell;
   monitoring, by the user equipment, whether the downlink control information comprises one resource assignment field or at least two assignment fields; and
   receiving, by the user equipment depending upon the monitoring, a downlink data signal from the serving cell and the one or more coordinating cells using the downlink scheduling information,
   wherein the downlink control information for the downlink data signal is received through one Physical Downlink Control Channel,
   wherein, when the downlink control information comprises one resource assignment field, the downlink data signal received from each of the serving cell and the one or more coordinating cells is received on an identical frequency band, and
   wherein, when the downlink control information comprises at least two assignment fields, the downlink data signal received from each of the serving cell and the one or more coordinating cells is received on a partially overlapped frequency band.

2. The method according to claim 1, wherein the downlink scheduling information comprises a carrier indicator field indicating a predetermined carrier.

3. The method according to claim 1, wherein the downlink data signal received from each of the serving cell and the one or more coordinating cells is classified by a spatial resource.

4. The method according to claim 1, wherein the downlink scheduling information comprises a carrier indicator field indicating a mapping relation between a plurality of the cells and a codeword transmitted from each of a plurality of the cells.

5. The method according to claim 1, further comprising receiving corresponding beamforming information from each of the one or more coordinating cells.

6. A user equipment in a cell cooperative wireless communication system, the user equipment comprising:
   a radio communication module configured to receive downlink control information including downlink scheduling information from a serving cell among a plurality of cells for the serving cell and one or more coordinating cells; and
   a processor operably coupled to the radio communication module,
   wherein the processor is configured to monitor whether the downlink control information comprises one resource assignment field or at least two assignment fields, and control the radio communication module to receive, depending upon the monitoring, a downlink data signal from the serving cell and one or more coordinating cells among a plurality of the cells using the downlink scheduling information through same component carrier, wherein, when the downlink control information comprises one resource assignment field, the downlink data signal received from each of the serving cell and the one or more coordinating cells is received on an identical frequency band, and wherein, when the downlink control information comprises at least two assignment fields, the downlink data signal received from each of the serving cell and the one or more coordinating cells is received on a partially overlapped frequency band.

7. The user equipment according to claim 6, wherein the downlink scheduling information comprises a carrier indicator field indicating a predetermined carrier.

8. The user equipment according to claim 6, wherein the downlink data signal received from each of the serving cell and the one or more coordinating cells is classified by a spatial resource.

9. The user equipment according to claim 6, wherein the downlink scheduling information comprises a carrier indicator field indicating a mapping relation between a plurality of the cells and a codeword transmitted from each of a plurality of the cells.

10. The user equipment according to claim 6, wherein the radio communication module is further configured to receive corresponding beamforming information from each of the one or more coordinating cells.

11. The method according to claim 1, wherein, when the downlink control information comprises at least two assignment fields, a first assignment field of the at least two assignment fields indicates an overlapped frequency band on which the downlink data signal received from each of the serving cell and the one or more coordinating cells, and a second assignment field of the at least two assignment fields indicates a total frequency band on which the downlink data signal is received.

* * * * *